United States Patent [19]
Lammerant et al.

[11] Patent Number: 6,079,557
[45] Date of Patent: Jun. 27, 2000

[54] PACKAGING FOR ACCOMMODATING A DISC-SHAPED INFORMATION CARRIER

[75] Inventors: Henri Lammerant; Filip Lammerant, both of Thulin, Belgium

[73] Assignee: Cartonneries de Thulin S.A., Belgium

[21] Appl. No.: 09/269,914

[22] PCT Filed: Dec. 5, 1997

[86] PCT No.: PCT/EP97/06818

§ 371 Date: Mar. 31, 1999

§ 102(e) Date: Mar. 31, 1999

[87] PCT Pub. No.: WO99/30322

PCT Pub. Date: Jun. 17, 1999

[51] Int. Cl.[7] .................................................. B65D 85/57
[52] U.S. Cl. ........................................ 206/308.1; 220/324
[58] Field of Search .................................. 206/303, 307, 206/308.1, 308.2, 309; 220/315, 324, 326

[56] References Cited

U.S. PATENT DOCUMENTS

| | | | |
|---|---|---|---|
| 3,670,875 | 6/1972 | Jones | 220/324 |
| 4,488,645 | 12/1984 | Yamaguchi . | |
| 5,285,918 | 2/1994 | Weisburn et al. | 220/324 |
| 5,310,053 | 5/1994 | Lowry et al. . | |
| 5,320,221 | 6/1994 | Kurz | 206/309 |
| 5,385,231 | 1/1995 | Nowotny . | |
| 5,394,981 | 3/1995 | Cameron . | |
| 5,551,560 | 9/1996 | Weisburn et al. | 206/308.1 |
| 5,713,463 | 2/1998 | Lakoski et al. | 206/308.1 |
| 5,788,068 | 8/1998 | Fraser et al. | 206/308.1 |
| 5,931,291 | 8/1999 | Sedon et al. | 206/308.2 |

FOREIGN PATENT DOCUMENTS

| | | |
|---|---|---|
| 0 159 860 A2 | 10/1985 | European Pat. Off. . |
| 0 414 306 A1 | 2/1991 | European Pat. Off. . |
| 0 559 273 A2 | 9/1993 | European Pat. Off. . |
| 0 568 298 A1 | 11/1993 | European Pat. Off. . |
| 0 614 189 A1 | 9/1994 | European Pat. Off. . |
| 42 18 437 A1 | 12/1993 | Germany . |

*Primary Examiner*—Jim Foster
*Attorney, Agent, or Firm*—Robert W. Becker & Associates

[57] ABSTRACT

A packaging for receiving a disc-shaped information carrier such as a CD has a disc holder in the form of an injection-molded plastic part. The disc holder has a depression into which the information carrier can be placed from above. Securing elements are formed at the disc holder for the information carrier inserted into the depression. A substantially rectangular cover is provided for the disc holder. The cover is connected with a first edge of the cover to the disc holder. A closure is fixedly connected to a second edge of the cover opposite the first edge, wherein the closure together with the disc holder is a component of one and the same injection-molded plastic part. The material connection between the disc holder and the closure is at least one break point, wherein after breakage of the at least one break point the closure, already connected to the cover, is detachably secured to the disc holder.

13 Claims, 8 Drawing Sheets

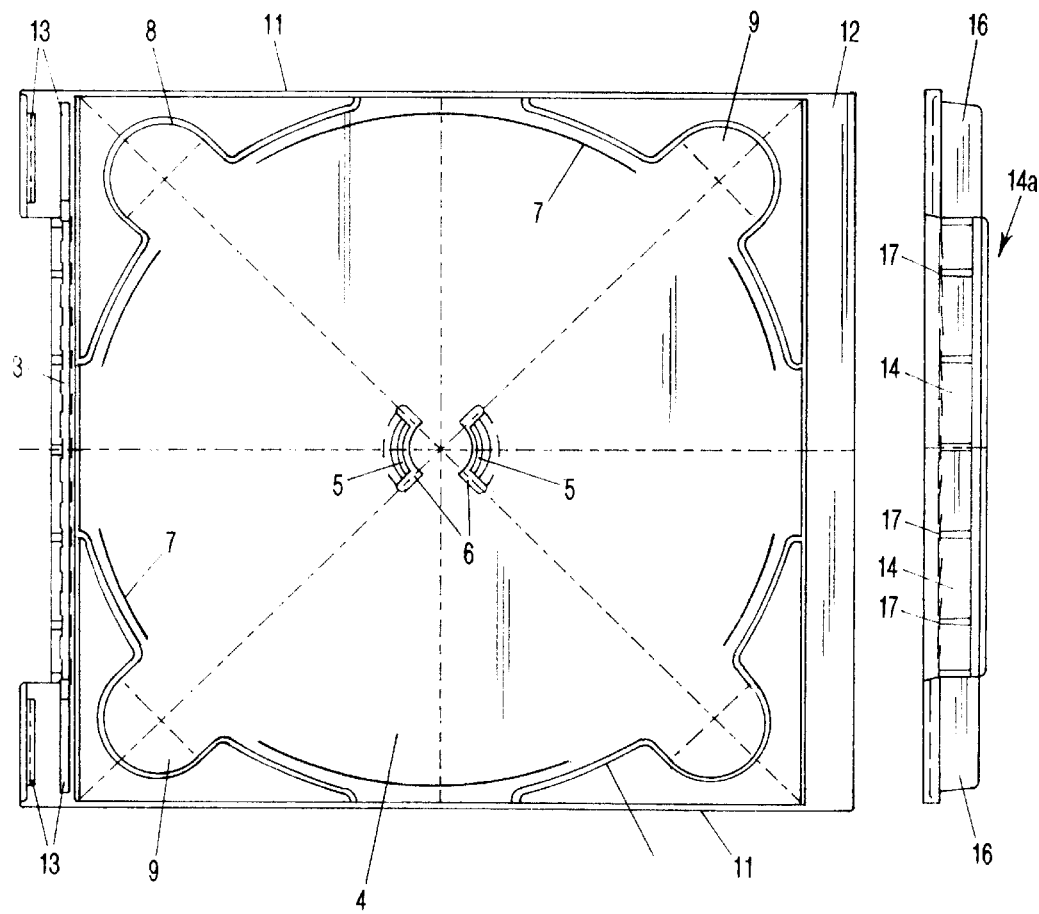
FIG-2
FIG-4
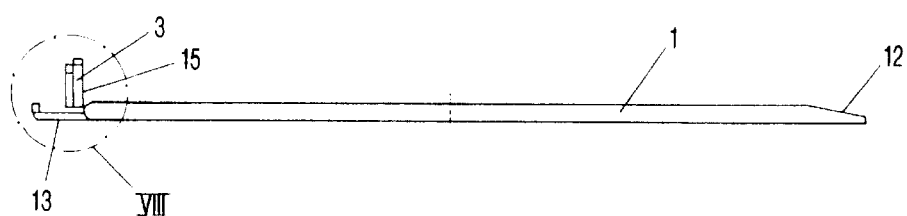
FIG-3

PACKAGING FOR ACCOMMODATING A DISC-SHAPED INFORMATION CARRIER

BACKGROUND OF THE INVENTION

The invention relates to a packaging for receiving a disc-shaped information carrier, especially a compact disc, comprising a disc holder manufactured as a injection molded plastic part which has a depression into which the information carrier can be placed from above and furthermore comprising securing elements, formed at the disc holder, for the information carrier placed into the depression, as well as furthermore comprising a substantially rectangular cover for the disc holder which is connected along one of its edges to the disc holder while the opposite free edge of the cover is detachably connectable by a closure to the disc holder.

Such packagings are known in various embodiments and are widely used in the audio sector for storing compact discs.

A packaging of the aforementioned kind is, for example, the world wide leading so-called jewel box which is comprised of a bottom part and a cover part manufactured of transparent plastic material as well as a disc holder positioned there between. The bottom and cover parts are designed constructively such that paper information brochures, booklets etc. can be inserted therein manually or by a machine. By folding these information brochures twice at opposite edges of the end face of the packaging, there is the advantage that the folded areas can be labeled similar to the spine of a book. The bottom and cover parts are connected pivotably to one another at a common edge by a hinge device and can thus be folded open like a book. Into the disc holder, also called tray, a CD is automatically inserted with a corresponding machine, and the disc holder is subsequently inserted into the bottom part with clamping fit. The disc holder is embodied with clamping elements which engage the center hole of a CD and thus arrest it.

Since compact discs gain great importance as data carriers in data processing, as so-called CD-ROMs, and are increasingly used as an insert in computer journals, a packaging is needed that fulfills the requirements of a design that is flat and light-weight, but bending-resistant and sufficiently protective with respect to environmental influences.

With respect to these properties, the aforementioned known CD packaging has, however, manufacturing-technological as well as application-related disadvantages. For example, the disc holder can not be inserted during the manufacture into the bottom part because of the information brochure to be interposed so that a cost-intensive, separate handling of top and bottom parts, disc holder, and text insert is required. Furthermore, such packagings, due to their thickness of at least 8 mm that cannot be reduced for constructive reasons, are relatively large and heavy.

Furthermore, a packaging is known which is comprised of cardboard that is divided into three fields to which is adhesively connected a formed, rectangular plastic disc holder of a known kind. The two outer thirds of the cardboard can be folded wing like inwardly and form then by overlapping and resting on one another the cover for the upper side of the disc holder. The front and back sides of this packaging are provided with printed text information with the exception of the area where the disc holder is attached. In addition, at the inner surfaces of the wings outwardly foldable text inserts or booklets can be attached. A disadvantage of this known packaging is the lack of a lockable closure of the cover so that it can open by itself. In order to provide for a sufficient bending resistance, the two wings in the closed state form a double cover with the result that the known packaging in its outer size substantially corresponds to that of the jewel box and is thus also relatively large and heavy.

In a further known packaging a rectangular disc holder that is made by injection molding of plastic is adhesively connected to a cardboard that is foldable and encloses in the folded state the disc holder. The free edge of the cover can be secured at the disc holder by a closure that is connected to the disc holder by a hinge and engages the cover. This packaging, in principle, can be manufactured in a simple manner and inexpensively, and, because of the securing action of the cover by a closure, also provides for excellent protection against environmental influences, but, because of its outer dimensions and the use of solid cardboard material required for reasons of stability, it is relatively large and heavy.

It is therefore an object of the invention to improve a packaging for receiving a disc-shaped information carrier, especially a compact disc, such that it can be manufactured in a simple, fast, and inexpensive manner and exhibits at the same time an especially flat and light-weight design in comparison to known packagings.

SUMMARY OF THE INVENTION

As a solution for a packaging of the aforementioned kind it is suggested that the closure is fixedly connected to the free edge of the cover.

With such a packaging in the closed state, a form-locking attachment of the cover at the disc holder is achieved in a simple manner which provides for an especially flat and light-weight design.

In a further advantageous embodiment of the invention, the closure is a plastic strip that is connected to the free edge over its entire length. With this design the cover is provided with increased stiffness and stability, and it is uniformly tightened upon closing the packaging.

In order to achieve a permanent and easy opening and closing action of the packaging for repeated use, it is furthermore suggested that the closure is provided with fastening sections which cooperate with correspondingly shaped catch or snap elements at the disc holder in order to secure the closure at the disc holder.

Advantageously, the closure is glued to the cover because this is a simple and inexpensive manufacturing method.

In principle, the cover can be comprised of any suitable material, for example, a flexible plastic foil. A cover of paper or cardboard is suggested as an especially suitable cover because this provides for an inexpensive and light-weight design of the packaging. Furthermore, paper has the advantage that the cover can be printed with information and thus there are no further manufacturing costs for placing text inserts.

In a preferred embodiment the cover is glued to the under side of the disc holder and, in addition, is glued to an upwardly facing strip-shaped surface of the disc holder that extends along the edge. In this manner a secure, sliding-resistant seat of the cover is ensured. Also, the upwardly facing, strip-shaped adhesive surface ensures that a uniform folding edge at the upper side of the disc holder results which allows for reliable opening and closing of the cover.

In order to achieve that the packaging is very flat and thus especially suitable as an insert for magazines, the thickness measured between the upper and underside of the disc holder is 2 mm to 4 mm.

The invention further suggests that the disc holder and the closure are materially connected by at least one rated break point since they are the component of one and the same injection-molded plastic part. In this manner, the packaging can be produced of a single plastic part so that a simple and inexpensive manufacture is possible. According to a further preferred embodiment of the invention, it is suggested that the rated break point extends only over a central portion of the elongate closure and that at both ends of this central portion of the closure fastening sections are provided which cooperate with correspondingly shaped catch or snap elements at the disc holder in order to secure the closure at the disc holder. This achieves that the closure when closed functions doubly as a snap closure and a clamping closure.

For the purpose of sealing the packaging, it is suggested that a plurality of point material connections arranged in a row are provided as break points. In this manner, in addition to a simple breaking action of the closure, a subsequent clamping action by the broken-off stays results. When the disc holder and the closure are materially connected by the break point up to the point when the desired breaking of the break point takes place, and are further in form-locking connection by the catch or snap elements, it is not possible to return the packaging into its original state after the first opening. This provides an inherent sealing protection of the information carrier resulting from the manufacture which thus makes theft from the closed packaging more difficult.

Expediently, the breakage of the break points takes place by bending the closure relative to the disc holder so that at the same time an improved protection against the disc slipping out during opening of the packaging is ensured.

In order to provide a space-saving and simple stacking action of multiple packagings, it is suggested to provide the underside of the disc holder with a planar, flat surface.

Finally, it is suggested that at the underside of the disc holder lateral guide grooves are provided in order to allow for a directed and slip-resistant stacking.

BRIEF DESCRIPTION OF THE DRAWINGS

Further details and advantages of the object of the invention are subsequently explained with the aid of the embodiments represented in the drawings.

It is shown in:

FIG. 2 a plan view onto the disc holder with the closure folded upwardly;

FIG. 3 a side view of the disc holder according to FIG. 2;

FIG. 4 a front view of the disc holder according to FIG. 2;

DESCRIPTION OF PREFERRED EMBODIMENTS

Figure 1:
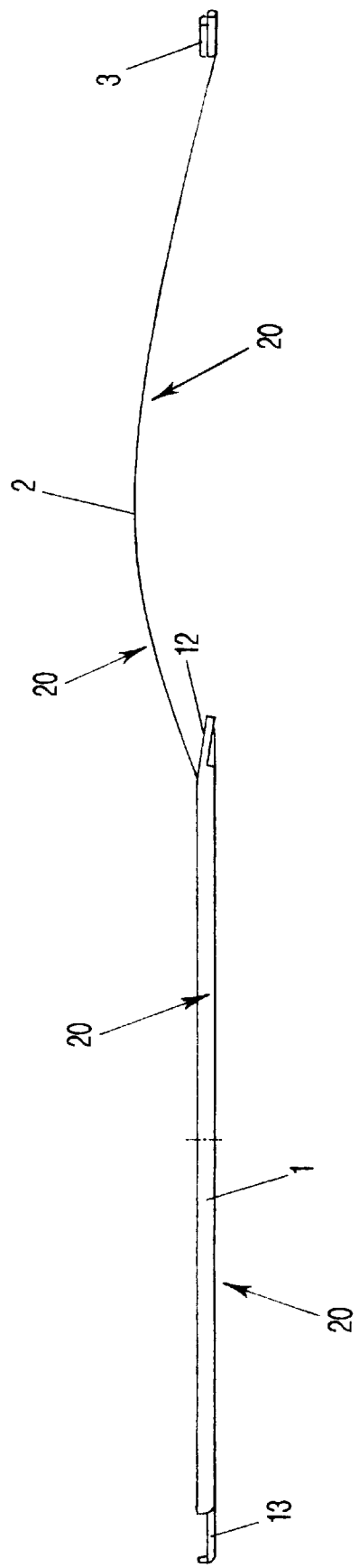
FIG. 1 a complete side view of the open packaging.

The inventive packaging according to FIG. 1 is comprised of a flat disc holder 1 having a thickness of 2–4 mm, a cover 2 enclosing it, and a closure 3, whereby the cover 2 is preferably comprised of paper or cardboard. The disc holder 1 as well as the closure 3 are produced as a unitary part of conventionally employed transparent or tinted plastic by injection molding, i.e., until the time of first opening of the packaging by the user they are components of one and the same injection-molded plastic part.

As can be seen in FIG. 2, the disc holder 1 has a substantially rectangular shape in plan view and has at its upper side a substantially square depression 4 which may receive, for example, a compact disc (CD) or any other information carrier.

Figure 5:
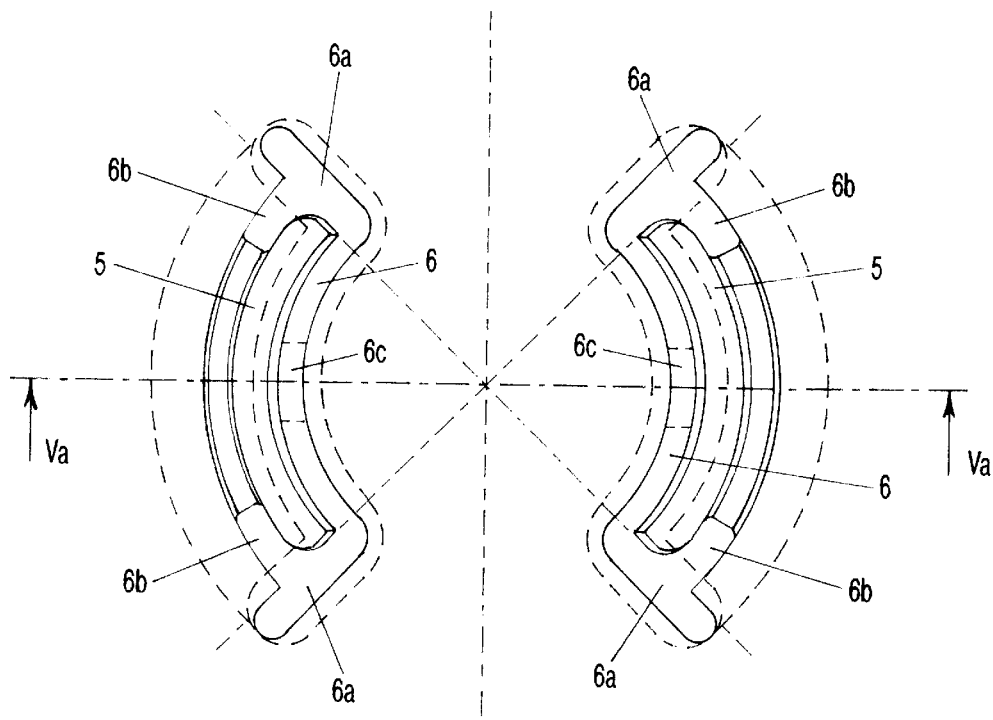
FIG. 5 a plan view onto the securing elements for securing the information disc.
Figure 5A:
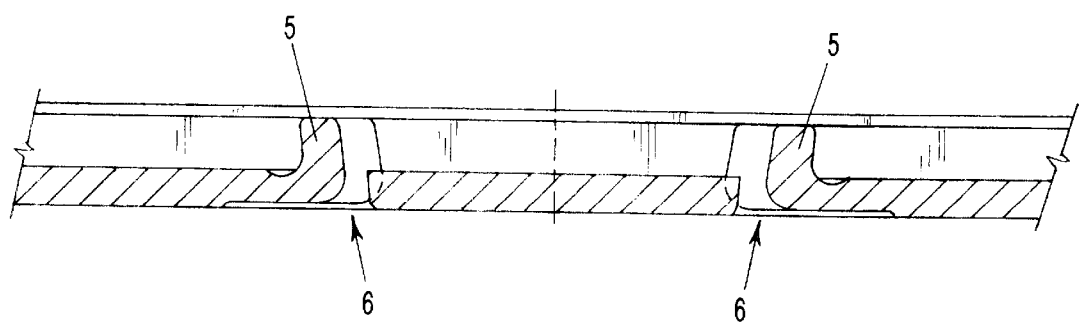
FIG. 5a a section of the securing elements in the plane Va—Va of FIG. 5.

According to FIGS. 5 and 5a in the central area spring-elastic securing elements 5 are formed which are slightly oversized so that the CD conventionally provided with a central hole can be pushed with light pressure onto the securing elements in order to be centered by clamping in this position. The securing elements 5 are comprised of two oppositely positioned part-circular clamping rings which are respectively surrounded at their inwardly oriented sides by a slot 6 penetrating the disc holder and thus producing the spring action. The slot 6 has a t its two ends a short radially extending portion 6a from where undercuts 6b, which also penetrate the disc holder, extend and surround the securing elements 5 at their outer side in a part-circular shape. This improves the securing action of the securing elements 5. A stay 6c indicated in dashed lines in FIG. 5 interrupts the slot 6 and may further improve the securing force applied to the CD. The securing elements 5 have a minimal height so that their upper edge does not project past the height of the other portions of the disc holder 1 having a thickness of 2 mm–4 mm.

FIG. 2 furthermore shows that ribs 7 concentrically arranged to the center hole of the CD support the inserted CD from below at its outer uncoated edge portion and thus provide protection against scratching.

Figure 6:
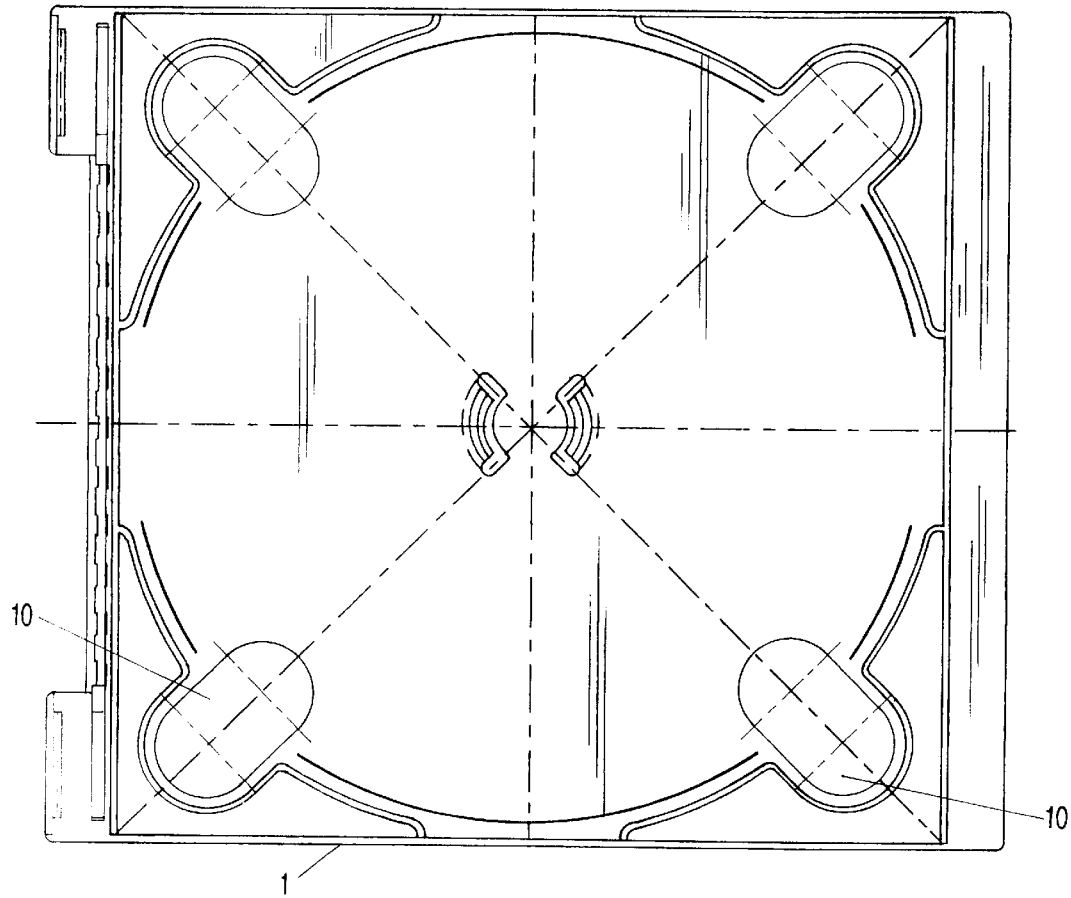
FIG. 6 a plan view of a further embodiment of the disc holder.

Within the depression 4 a reinforcement rib 8 surrounding the information carrier in a protective manner is provided which is widened at the corner portions of the depression 4 with substantially semi-circular projections 9 so that by engaging with a finger nail under the CD a simple and directed removal of the compact disc from the disc holder 1 is possible. An alternative embodiment, in which the projections 9 are elliptical grip holes 10 that are partly covered by the inserted CD, is shown in FIG. 6.

Figure 7:
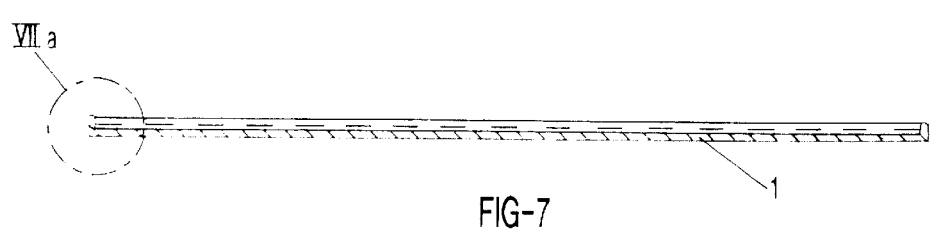
FIG. 7 a sectional view of the disc holder according to FIG. 2.
Figure 7A:
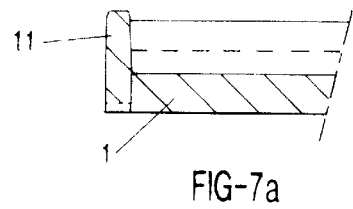
FIG. 7a an enlarged detail of the area indicated with VIIa in FIG. 7.

The disc holder 1 is provided with upwardly projecting terminating rims 11 (see FIGS. 7 and 7a) at two opposed lateral edges whereby these rims 11 project upwardly past the other design elements. The rims 11 open into a strip-shaped surface 12 that is slanted outwardly and forms the rear edge of the disc holder 1. Along the same length and width the underside of the disc holder 1 is provided with complementary guide grooves (not represented) which are to be engaged by the rim 11 upon stacking multiple disc holders so that a directed and sliding-resistant stacking is ensured. For providing a simple and automated manipulation of the stacked packages the underside of the stripe-shaped surface 12 is slightly inwardly displaced (not represented) with respect to the remaining planar underside of the disc holder 1 so that between stacked packagings recesses are formed which allow gripping from the front with respective gripping tools.

The edge of the disc holder 1 opposite the strip-shaped surface 12 is formed by upwardly open hook-shaped catch or snap elements 13 which cooperate with corresponding fastening sections of the closure 3 in order to allow for closing the packaging.

Details of the closure 3 are to be explained in the following with the aid of FIGS. 4 and 13. The closure 3 is comprised of a substantially rectangular plastic strip extending over the entire width of the disc holder 1 and having an upper side with a planar adhesive surface 15 (see FIG. 13). Its underside 14a is provided with a central portion with finger-wide grip elements 14 that are slightly projecting and have adjacent thereto at their ends fastening sections 16 (see FIG. 4) corresponding on the catch or snap elements of the disc holder 1. The grip elements, in addition to providing ergonomic manipulation of the closure, also serve to brace the flat plastic strip so that an exact and bending-resistant opening of the packaging is possible.

Figure 8:
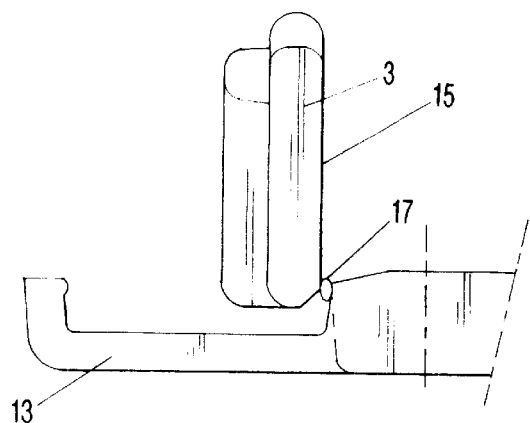
FIG. 8 a view of a detail of the snap and clamping enclosure indicated with VIII in FIG. 3.
Figure 9:
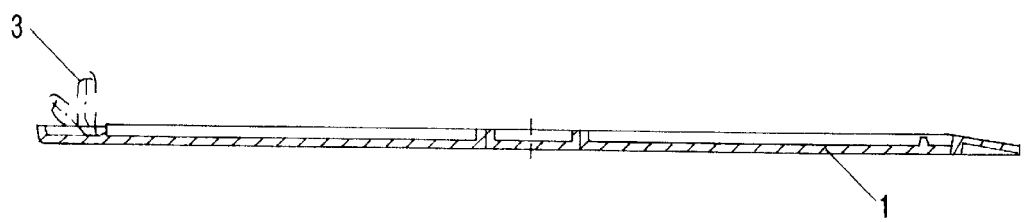
FIG. 9 a view corresponding to the sectional view of FIG. 3.
Figure 10:
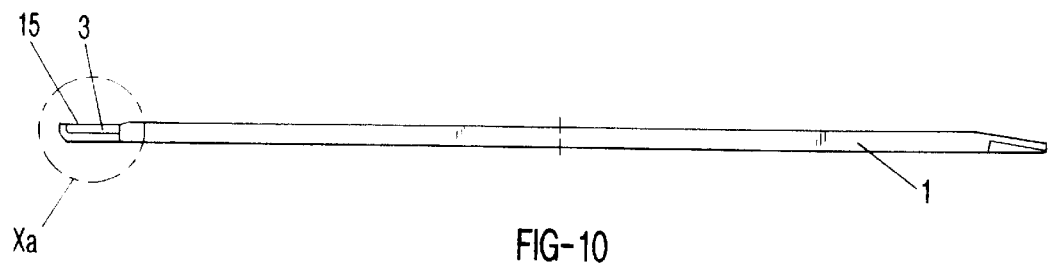
FIG. 10 a side view of the disc holder according to FIG. 2 with the closure folded over.
Figure 10A:
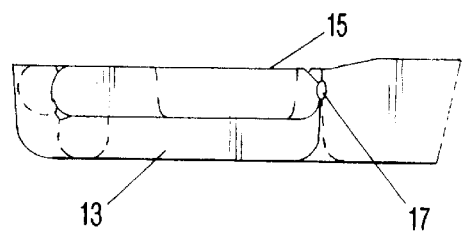
FIG. 10a a detail of the area indicated with reference numeral Xa in FIG. 10.

After injection molding in a common injection molding tool, the disc holder 1 and the closure 3 are connected to one another by a plurality of point material connections 17 arranged in a row between the snap and catch elements 13, respectively, the fastening sections 16. This is shown in FIGS. 3 and 8. The closure 3 is in a perpendicular position relative to the disc holder 1. In the thus produced injection-molded part the closure 3 is then folded over about the material connections 17 acting as hinges until the two fastening sections 16 engage the catch or snap elements. At this moment, the material connections 17, which serve as break points are still intact so that the disc holder 1 and the closure 3 are materially connected by the material connections 17 as well as a form-lockingly connected by the snap or catch elements 13 and the clamped fastening section 16. Only then the CD is inserted into the packaging and subsequently the cover 2 is connected by glueing at the provided adhesive locations to the single-piece injection-molded part. From this point in time on, the CD can only be removed from the packaging by releasing the closure 3 from the disc holder 1. When doing this the first time, this is only possible upon destruction of the material connections 7 so that a simple and effective sealing of the CD before first use is provided.

The material connections 17 are designed such that a single pivoting action in the manner of a hinge is possible, but however upon a subsequent return, material fatigue and breakage will occur.

Figure 11:
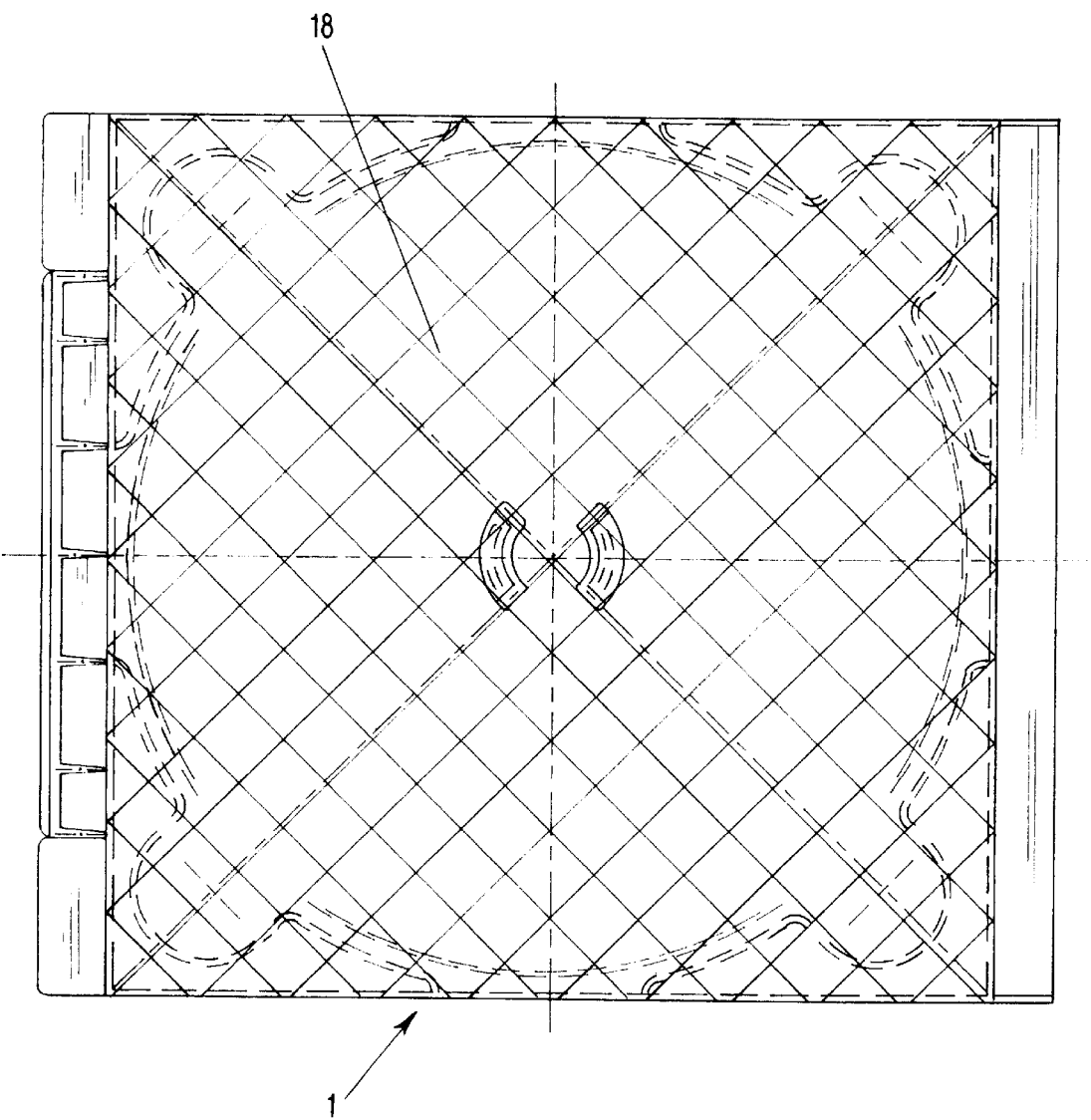
FIG. 11 in a view from below the lower adhesive surface of the disc holder.
Figure 12:
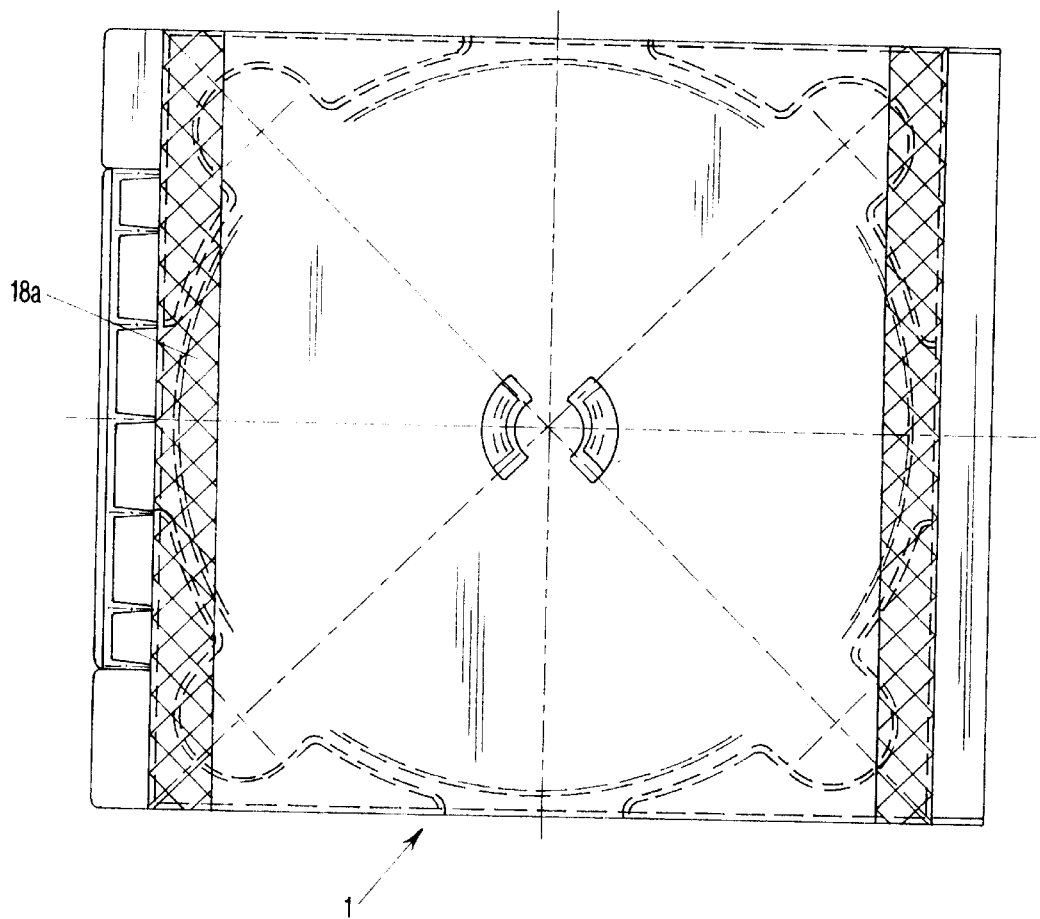
FIG. 12 an alternative embodiment of the lower adhesive surface.

The disc holder 1 is connected by glueing to the cover 2 that encloses it in the closed packaging state and is comprised of a single sheet of paper, card board or foil. As adhesive surfaces the double-hatched areas shown in FIGS. 11–13 are suitable. As the lower adhesive surface 18 either the complete planar underside of the disc holder 1 (see FIG. 11) can be used or, alternatively, only two small sections 18a which extend along the outer edge of the disc holder 1 (see FIG. 12) can be used. The latter alternative has the advantage that, when using a disc holder comprised of a clear plastic material, an additional advertising or information surface 20 at the underside of the packaging (FIG. 1) is provided which is visible when the CD is removed.

Figure 13:
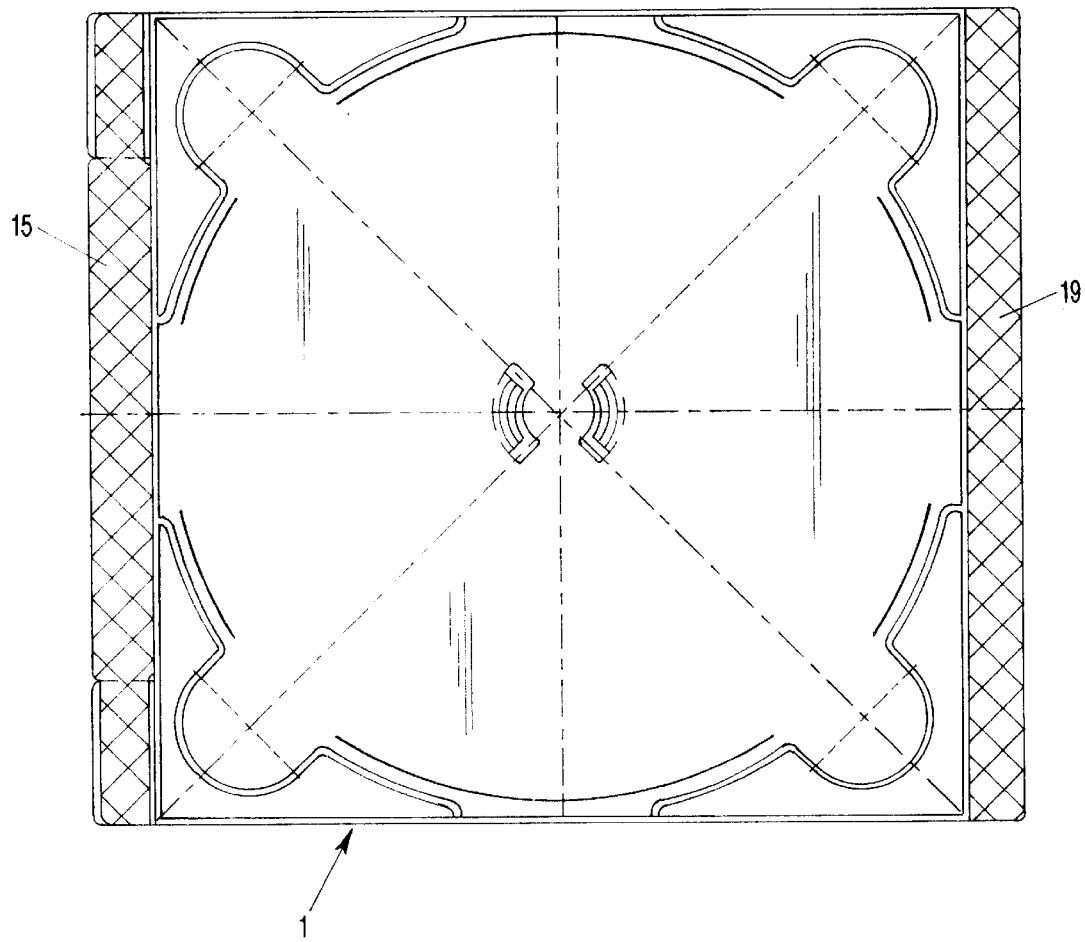
FIG. 13 in a plan view the upper adhesive surfaces of the disc holder and the closure.

The adhesive surfaces 19 and 15 at the upperside of the disc holder 1 are formed by the strip-shaped surfaces 12 and the aforementioned planar upper side of the folded over closure 3 (see FIG. 13). The adhesive connection is provided after the information carrier has been inserted and the closure is folded over, but still in material connection to the disc holder 1 so that only after breaking of the break points 17 upon bending carried out by the user the closure 3 is thus opened for the first time relative to the disc holder 1 in order to remove the CD. Accordingly, an inherent, inexpensive sealing protection for the information carrier is provided as a result of the manufacture. In order to protect the CD in addition against falling out of the disc holder 1, the cover 2 can be glued to the front side of the disc holder 1 up to the outer diameter of the CD.

Before gluing the cover 2 to the disc holder 1, a flat printed brochure can be inserted between the CD and the underside of the cover 2. This printed brochure can also be fixedly connected to the underside of the cover 2 especially since it is also made of paper.

The specification incorporates by reference the entire disclosure of International Application PCT/EP97/06818 of Dec. 5, 1997.

The present invention is, of course, in no way restricted to the specific disclosure of the specification and drawings, but also encompasses any modifications within the scope of the appended claims.

| List of Reference Numerals | |
|---|---|
| 1. | Disc holder |
| 2. | Cover |
| 3. | Closure |
| 4. | Depression |
| 5. | Securing elements |
| 6. | Slot |
| 6a. | Radially extending portion |
| 6b. | Undercut |
| 6c. | Stay |
| 7. | Support ribs |
| 8. | Reinforcement ribs |
| 9. | Projections |
| 10. | Grip holes |
| 11. | Upwardly projecting terminating rim |
| 12. | Strip-shaped surface |
| 13. | Catch or snap elements |
| 14. | Grip elements |
| 14a. | Underside of the closure |
| 15. | Adhesive surface of the closure |
| 16. | Fastening sections |
| 17. | Point material connection, break point |
| 18. | Lower adhesive surface of the disc holder |
| 18a. | Alternative lower adhesive surface |
| 19. | Upper adhesive surface of the disc holder |
| 20. | Advertising surface |

What is claimed is:

1. Packaging for receiving a disc-shaped information carrier, said packaging comprising:

a disc holder (1) comprised of an injection-molded plastic part and having a depression (4) into which the information carrier can be placed from above;

securing elements (5), formed at the disc holder (1), for the information carrier inserted into said depression (4);

a substantially rectangular cover (2) for said disc holder (1), wherein said cover (2) is connected with a first edge of said cover (2) to said disc holder (1);

a closure (3) fixedly connected to a second edge of said cover (2) opposite said first edge, wherein said closure (3) together with said disc holder (1) is a component of one and the same injection-molded plastic part, wherein the material connection between said disc holder (1) and said closure (3) is at least one break point (17), wherein after breakage of said at least one break point (17) said closure (3), already connected to said cover (20), is detachably secured to said disc holder (1).

2. Packaging according to claim 1, wherein said closure (3) is a plastic strip connected over an entire length to said second edge of said cover (2).

3. Packaging according to claim 1, wherein said closure (3) has fastening sections (16) and wherein said disc holder (1) has catch elements (13) having a shape matching said fastening sections (16), wherein said fastening sections (16) and said catch elements (13) cooperate with one another to secure said closure (3) at said disc holder (1).

4. Packaging according to claim 1, wherein said closure (3) is glued to said cover (2).

5. Packaging according claim 1, wherein said cover (2) is comprised of paper or cardboard.

6. Packaging according to claim 1, wherein said cover (2) is glued to an underside of said disc holder (1) and to an upwardly facing strip-shaped surface (12) of said first edge of said disc holder (1).

7. Packaging according to claim 1, wherein a thickness of said disc holder (1) measured between an upperside and an underside of said disc holder (1) is 2 mm to 4 mm.

8. Packaging according to claim 3, wherein said closure (3) has an elongate shape and wherein said at least one break point (17) extends only over a central portion of said elongate closure (3), wherein to both sides of said central portion of said elongate closure said fastening sections (16) are connected.

9. Packaging according to claim 1, wherein a plurality of said as break points (17) are arranged in a row.

10. Packaging according to claim 1, wherein said disc holder (1) and said closure (3) point (17) are connected by said at least one break point (17) until desired breakage of said at least one break point (17) occurs and, at the same time, are in a form-locking connection by said catch elements (13) and said fastening sections (16).

11. Packaging according to claim 10, wherein breakage of said at least one break point (17) is carried out by bending said closure (3) relative to said disc holder (1).

12. Packaging according to claim 1, wherein an underside of said disc holder (1) is a planar flat surface.

13. Packaging according to claim 12, wherein said underside of said disc holder (1) has lateral guide grooves.

* * * * *

UNITED STATES PATENT AND TRADEMARK OFFICE
CERTIFICATE OF CORRECTION

PATENT NO : 6,079,557
DATED : June 27, 2000
INVENTOR(S): Henri Lammerant and Filip Lammerant It is certified that error appears in the above-identified patent and that said Letters Patent are hereby corrected as shown be'ow:

On the title page, Item [54] should read as follows:

[54] PACKAGING FOR RECEIVING A DISC-SHAPED INFORMATION CARRIER

Signed and Sealed this

Tenth Day of April, 2001

*Attest:*

NICHOLAS P. GODICI

*Attesting Officer*   *Acting Director of the United States Patent and Trademark Office*